(12) United States Patent
Ahmed et al.

(10) Patent No.: US 8,103,260 B2
(45) Date of Patent: Jan. 24, 2012

(54) SYSTEM AND METHOD FOR PROVIDING CORDLESS EXTENSION OF COMMUNICATION DEVICES

(75) Inventors: Mohammed M. Ahmed, Schaumburg, IL (US); Rajesh S. Pazhyannur, Lake Zurich, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 844 days.

(21) Appl. No.: 11/280,433

(22) Filed: Nov. 16, 2005

(65) Prior Publication Data

US 2007/0111723 A1 May 17, 2007

(51) Int. Cl.
*H04M 3/42* (2006.01)
(52) U.S. Cl. .... 455/416; 455/462; 455/418; 379/202.01
(58) Field of Classification Search ............ 379/202.01; 455/416, 462, 418, 414.1, 422.1; 370/352; 433/426.2, 476.1, 516, 519, 334.2, 334.1
See application file for complete search history.

(56) References Cited

U.S. PATENT DOCUMENTS

| 5,528,666 | A | 6/1996 | Weigand et al. |
| 5,953,400 | A * | 9/1999 | Rosenthal et al. ....... 379/202.01 |
| 6,351,653 | B1 | 2/2002 | Alberth, Jr. et al. |
| 6,690,956 | B2 * | 2/2004 | Chua et al. ................ 455/569.2 |
| 6,754,323 | B1 * | 6/2004 | Chang et al. ............. 379/205.01 |
| 6,873,839 | B2 | 3/2005 | Stanforth |
| 6,978,001 | B1 * | 12/2005 | Shaffer et al. ............ 379/202.01 |
| 6,983,042 | B1 * | 1/2006 | Chapman et al. ........ 379/201.02 |
| 6,993,367 | B2 * | 1/2006 | Yamato et al. ............. 455/569.2 |
| 7,016,673 | B2 * | 3/2006 | Reddy et al. ............... 455/426.2 |
| 7,142,852 | B2 * | 11/2006 | Tell et al. ................... 455/426.2 |
| 7,218,930 | B2 * | 5/2007 | Ko et al. .................... 455/426.1 |
| 7,409,218 | B2 | 8/2008 | Bonta |
| 2003/0032460 | A1 * | 2/2003 | Cannon et al. ................ 455/569 |
| 2004/0127214 | A1 | 7/2004 | Reddy et al. |
| 2005/0068938 | A1 * | 3/2005 | Wang et al. .................... 370/352 |

FOREIGN PATENT DOCUMENTS

WO 0225901 A2 3/2002

OTHER PUBLICATIONS

KIPO'S Notice of Preliminary Rejections (English Translation).

* cited by examiner

*Primary Examiner* — Danh C Le

(57) ABSTRACT

A method of providing a cordless extension system for a plurality of communication devices in a defined environment, the method comprising the steps of: detecting that a first communication device of the plurality of communication devices is placing a call in the defined environment (205); in response to detecting, automatically creating a conference bridge involving all of the plurality of communication devices, wherein the first communication device is placed in an active mode, and wherein a second communication device of the plurality of communication devices that is on-hook is placed in a dormant mode (210). The invention proposes to include a Call Agent (CA) (600) that is configured to provide a cordless extension for the plurality of communication devices in a defined environment.

16 Claims, 6 Drawing Sheets

SYSTEM AND METHOD FOR PROVIDING CORDLESS EXTENSION OF COMMUNICATION DEVICES

FIELD OF INVENTION

The present invention relates generally to communication networks and more specifically to providing a cordless extension system for a plurality of communication devices in a defined environment.

BACKGROUND OF THE INVENTION

A typical urban household has a Public Switched Telephone Network (PSTN) line with multiple phone jacks. Often, one or more phone equipment is connected to these jacks. More recently, cordless phone manufacturers have started offering systems with multiple cordless phones attached to the same base. Thus, users have gotten accustomed to a degree of seamlessness offered by this in-home telephony system. Specifically, the user can pick up any phone equipment to initiate a call without distinguishing one piece of equipment from another. The user can change any phone equipment during the call with considerable ease. Moreover, users can join an ongoing call by picking up one or more phone devices in the home.

Considering the trend towards deployment of Voice over Internet Protocol (VoIP) based services in the home, a similar degree of seamlessness as provided by the telephony system described earlier would be desired in the VoIP based environment. For this purpose, a terminal adapter has been introduced, which converts a Plain Old Telephone Service (POTS) phone into a Session Initiation Protocol (SIP) Phone by connecting to the POTS phone and in-turn interworks with a SIP server through a broadband connection (provided by Digital Subscriber Line (DSL) or a cable system). This was the first generation of VoIP services.

In the next generation of VoIP services, it is predicted that numerous home devices will support VoIP natively. These could include, for example, software based VoIP clients (for example on home computers), desk-phones connected over Local Area Network (LAN) to the home network, cordless phone systems running on the home Wireless Local Area Network (WLAN) system, dual-mode cellular-WLAN devices behaving as VoIP (over WLAN) and cable set top boxes with built-in WLAN clients.

Thus, there exists a need for a method and a system to reproduce an experience identical to either of the current in-home systems described earlier, for example multi-device cordless phone system or the system with multiple phones connected to multiple jacks in the home, in a VoIP serviced environment.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION OF THE INVENTION

Figure 1:
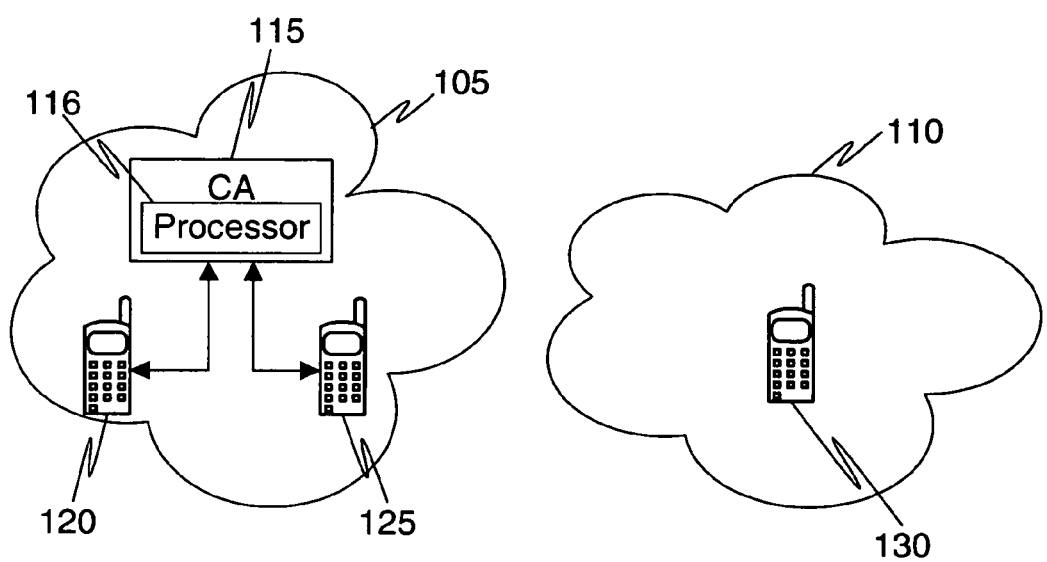
FIG. 1 is a block diagram that indicates generally a plurality of communication devices in a defined environment in accordance with various embodiments of the present invention.

Before describing in detail embodiments that are in accordance with the present invention, it should be observed that the embodiments reside primarily in combinations of method steps and apparatus components related to a method and apparatus for providing cordless extension for a plurality of communication devices in a defined environment. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

In this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that embodiments of the invention described herein may be comprised of one or more conventional processors and unique stored program instructions that control the one or more processors to implement, in conjunction with certain non-processor circuits, some, most, or all of the functions of the method and apparatus for providing cordless extension for a plurality of communication devices in a defined environment described herein. The non-processor circuits may include, but are not limited to, a radio receiver, a radio transmitter, signal drivers, clock circuits, power source circuits, and user input devices. As such, these functions may be interpreted as steps of a method to provide cordless extension for a plurality of communication devices in a defined environment described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Generally speaking, pursuant to the various embodiments, the invention provides a method and a system for providing cordless extension for a plurality of communication devices such as hardware/desktop LAN phones, WLAN phones, soft phones, and dual-mode (for instance, WLAN-Cellular) phones in a defined environment. A "defined environment" can be a location area serviced by a Voice over Internet Protocol (VoIP) network or a home area comprising a residential gateway connecting either multiple computers in the home to a single Internet connection or all internal home networks (telephone, LAN, cable TV, etc.) to their external counterparts. The term "communication device" herein shall be used to describe any device or software capable of interacting with a call server to originate or terminate voice calls. Providing a cordless extension in a diverse phone environment includes enabling features wherein all devices (soft and hard) in the defined environment ring for incoming calls. Additionally, a user is able to answer from any communication device in the defined environment and the user is able to join an in-progress call by picking up another communication device in the defined environment (for example, similar to the existing Public Switched Telephone Network (PSTN) telephone system). Similarly, users can also hang up the call without dropping the call when there are other active communication devices within the defined environment. The present invention, thus, attempts to reproduce an experience identical to a conventional in-home system, for example multi-device cordless phone system or the system with multiple phones connected to multiple jacks in the home in a voice over Internet Protocol (VoIP) network or a home area comprising a residential gateway.

For a communication device that is a dual-mode phone, those with ordinary skill in the art will recognize that a user need not distinguish the dual-mode phone from "in-home" communication devices. Thus, a dual-mode phone roaming into the defined environment would allow the user to join an in-progress call inside the defined environment in accordance with the embodiments of the present invention. Also, assuming the communication devices support multiple line-appearances, the above-mentioned features can apply to all the in-progress calls. An example feature is placing a call on hold on one communication device and picking it up from another communication device. Additionally, if there are multiple phones for a call, and some of them are dual-mode phones, the calling experience as described above is maintained if an active dual-mode phone roams out of the home. Specifically, the call can have the same devices active as before the phone roamed out of the house. Those skilled in the art will realize that the above recognized advantages and other advantages described herein are merely exemplary and are not meant to be a complete rendering of all of the advantages of the various embodiments of the present invention.

Referring now to the drawings, and in particular to FIG. 1, a block diagram depicting a plurality of communication devices in a defined environment is shown in accordance with various embodiments of the present invention and is indicated generally at 105. The defined environment 105 is illustrated with two communication devices 120 and 125 for clarity of illustration. The communication device 130 is a part of an environment 110 outside the defined environment 105. Those skilled in the art will recognize that there can be any number of communication devices in the defined environment and outside the defined environment and the depiction shown in FIG. 1 is only for exemplary purposes. The communication devices 120 and 125 can be in-home devices such as software VoIP clients, WLAN phones, and dual-mode phones. For example, software based VoIP clients can be on home computers or desk phones connected over LAN to the home network or cordless systems running on the home network. WLAN phones can be cordless phone systems running on the home WLAN system or cable set top boxes with built-in WLAN clients and dual-mode phones can be dual-mode cellular-WLAN devices behaving as VoIP (over WLAN). The communication device 130 can enter the defined environment 105 and join an in-progress call in the defined environment, provided that the communication device 130 is a dual-mode phone. For example, a phone that supports WLAN and a cellular network can be a dual mode phone. A dual-mode phone inside the defined environment 105, for example the communication device 120, can roam to an environment 110 outside the defined environment 105 and still retain an in-progress call outside the defined environment 105. A call agent 115 residing inside the defined environment 105 is in communication with the plurality of communication devices 120 and 125 inside the defined environment 105. The call agent 115 is responsible for facilitating the cordless extension for the communication devices inside the defined environment 105.

Figure 2:
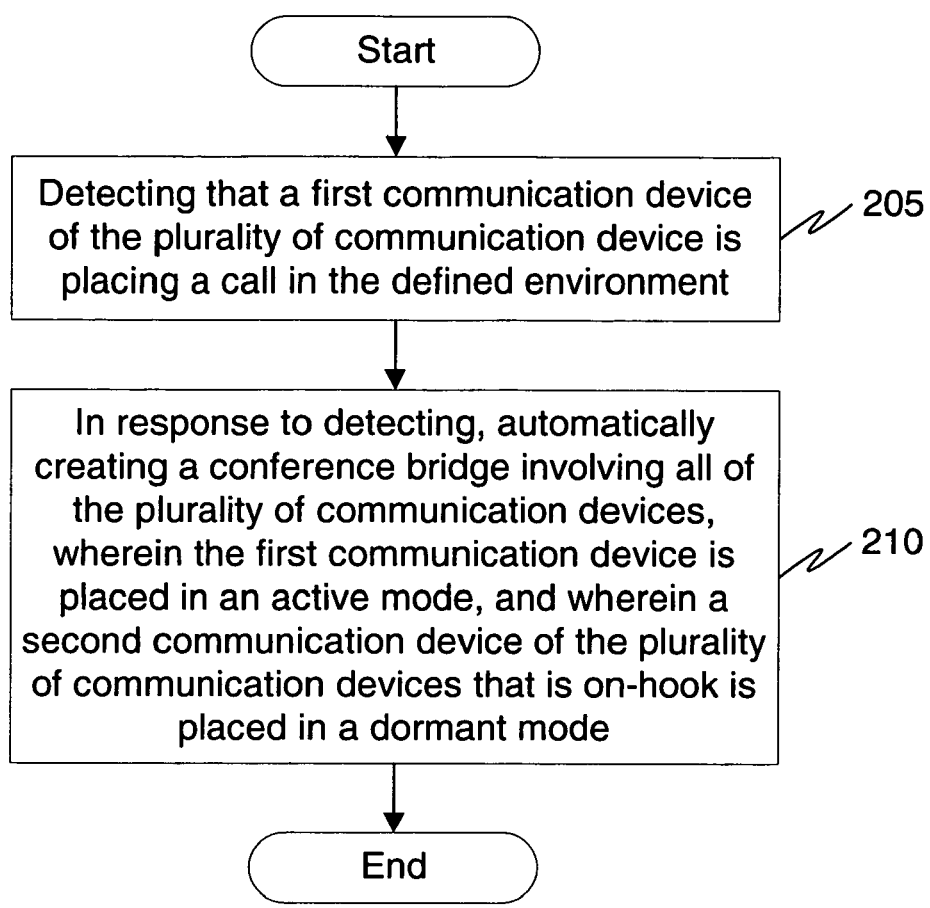
FIG. 2 illustrates a flow diagram of a method for providing a cordless extension system for a plurality of communication devices in a defined environment in accordance with various embodiments of the present invention.

Turning now to FIG. 2, a flow diagram of a method for providing a cordless extension system for a plurality of communication devices in a defined environment is illustrated in accordance with various embodiments of the present invention. As per the embodiment, the defined environment considered here includes a Session Initiation Protocol (SIP) based call-server, although those skilled in the art will recognize that the call-server can be based on any technology that may serve the purpose disclosed below. All communication devices in the defined environment, including the dual mode communication devices that roam in, are required to register with a call agent in the defined environment. An updated list of all registered communication devices is maintained with the call agent. The method for providing the cordless extension system for the plurality of communication devices in the defined environment comprises detecting that a first communication device of the plurality of communication devices is placing a call in the defined environment, step 205. In response to detecting, a conference bridge involving all of the plurality of communication devices is automatically created, step 210. The step 210 further comprises placing the first communication device in an active mode, and placing a second communication device of the plurality of communication devices, which is on-hook, in a dormant mode. A communication device in an active mode implies that a call is in progress and the communication device is "off-hook" while a communication device in a dormant mode implies that a call is in progress but the communication device is "on-hook". When the communication device becomes "off-hook", it may be placed in the active mode. Those skilled in the art will recognize that there can be more than two communication devices in the defined environment, with the first communication device and the second communication device being any of the plurality of communication devices. Thus, all communication devices in the defined environment that are on-hook are placed in dormant mode when at least one communication device is active; thereby allowing users within the defined environment to pick up an in-progress call from any of the plurality of communication devices that are in dormant mode. Similarly, all communication devices that are off-hook are placed in active mode when at least one communication device is active.

There are various scenarios that can be considered for providing a cordless extension for a plurality of communication devices. One such scenario is when all communication devices are inside the defined environment during a call (i.e., no devices roam in or out of the defined environment during the call). Another scenario is when a dual-mode communication device roams into the defined environment from outside the defined environment (for example, a cellular network) during the call. Yet another scenario is when a dual-mode communication device roams out of the defined environment during an in-progress call. Each of these scenarios is described in detail below.

Figure 3:
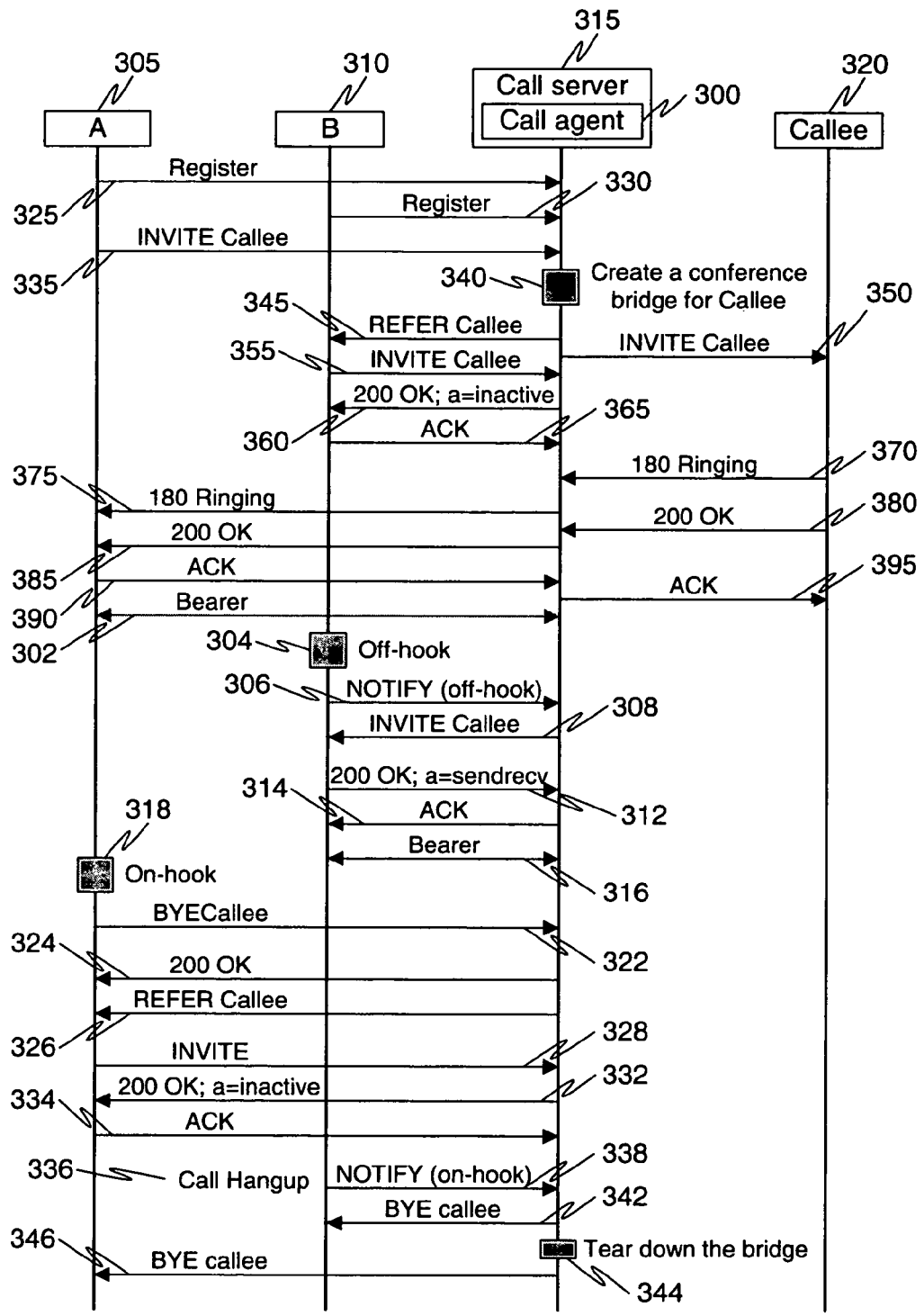
FIG. 3 illustrates a call flow diagram of a scenario where the communication devices are inside a defined environment during an in-progress call in accordance with various embodiments of the present invention.

Referring now to FIG. 3, a call flow diagram illustrating a scenario where all communication devices are inside a defined environment during an in-progress call is shown in accordance with various embodiments of the present invention. A "defined environment" can be a location area serviced by a Voice over Internet Protocol (VoIP) network or a home area comprising a residential gateway connecting either multiple computers in the home to a single Internet connection or all internal home networks (telephone, LAN, cable TV, etc.) to their external counterparts. As illustrated in FIG. 3, there are two communication devices within the defined environment, communication device A 305 and communication device B 310. However, those skilled in the art will recognize that the number of communication devices in the defined environment is not restricted to two, and the method extends to an arbitrary number of communication devices in the defined environment. A call agent 300 is used to facilitate a cordless extension for the communication devices within the defined environment. According to one embodiment of the present invention, the call agent 300 can reside on a call server 315. All of the communication devices are required to register with the call server 315 within the defined environment. The call agent 300 maintains an updated list of all the registered communication devices in the defined environment. An external communication device, callee 320, can reside outside the defined environment. The communication device A 305 and communication device B 310 that reside in the defined environment are required to register with the call server 315 as shown generally at step 325 and 330. A user places a call using the communication device A 305 to the external communication device, callee 320, by sending an INVITE message (step 335) to the call agent 300. The INVITE message triggers the call agent 300 to automatically create a conference bridge (step 340) since there can be multiple communication devices registered in the defined environment and they may all wish to join the call at any point in time. The external communication device, callee 320, can be a Session Initiation Protocol (SIP) capable device. In the event the external communication device, callee 320, is not SIP capable, the call server 315 can provide the required interworking between SIP (and Real-time Transport Protocol (RTP)) and the external communication device, callee 320, that is not SIP capable. The method of interworking is generally known in the art.

In the present scenario, communication device B 310 is included in the conference bridge but is not participating in the call. The call agent 300 places communication device B 310 in dormant mode. Placing communication device B 310 in dormant mode comprises the call agent 300 sending a REFER message (step 345) to communication device B 310 since it may potentially join the conversation along with communication device A 305. The call agent 300, sends an INVITE to the external communication device, callee 320, with a conference identification number to notify the callee 320 about the call initiated by communication device A 305 (step 350). In step 355, communication device B 310 sends an INVITE message to the call agent 300. In response to the INVITE message, the call agent 300 sends a 200 OK response at step 360 with an indication that device B 310 is inactive ('a=inactive'), i.e., in dormant mode. The status assigned to communication device B ensures that while communication device B 310 has joined the conference bridge, no media is sent to and from the call server 315 to communication device B 310. Communication device B 310 further acknowledges the 200 OK response by sending an ACK message to the call agent 300, step 365.

When the INVITE message is forwarded to the external communication device, the callee 320 (step 350), the device is informed of an incoming call by ringing. The call agent 300 is notified of the ringing at step 370. At step 375, the call agent 300, in turn, notifies communication device A 305 of the ringing. At step 380, the callee 320 accepts the call and sends a 200 OK response to the call agent 300. The 200 OK response is forwarded to communication device A 305 at step 385. Call setup is complete when an acknowledgement is sent to the call agent 300 by communication device A 305 (step 390) and when the call agent 300 forwards the acknowledgement to the callee 320 (step 395). Communication device A 305 becomes the bearer of the call with the callee 320, as shown at step 302 (for example communication device A 305 is put in active mode). Those skilled in the art will recognize that the steps of placing communication device B 310 in dormant mode (comprising steps 345, 355, 360 and 365) and placing communication device A 305 in active mode (comprising steps 370, 375, 380, 385, 390 and 395) may happen in parallel.

Now, in accordance with the embodiment depicted in the FIG. 3, if communication device B 310 wishes to join the in-progress call between communication device A 305 and the callee 320, communication device B 310 is taken off-hook (step 304), for example by a user picking up the receiver of the communication device B 310. At step 306; the off-hook information is conveyed to the call agent 300 using a SIP "NOTIFY" message. The message functions as a stimulus to the call agent 300 to invite communication device B 310 to join the conference. The call agent 300 then sends a re- INVITE to communication device B 310 at step 308. Communication device B 310 accepts the INVITE by sending a response 200 OK to the call agent 300 (step 312). Upon the call agent 300 acknowledging the response 200 OK message received from communication device B 310, at step 314, communication device B 310 changes mode from dormant to active and becomes a bearer of the call (step 316), along with communication device A 305.

In the present scenario, at step 318, communication device A 305 hangs up the call or goes on-hook while communication device B 310 continues to talk. This scenario is signaled to the call agent 300 using a BYE message (step 322). Upon reviewing the bye message, call agent 300 sends a response 200 OK message (step 324) confirming that communication device A 305 has left the call and thus should be placed in dormant mode. Consequently, the call agent 300 detects that the communication device A 305 is no longer an active participant in the call and automatically places communication device A 305 on-hold (dormant mode) instead of ending the call since communication device B 310 is still active on the call. The procedure of placing communication device A 305 in dormant mode is similar to the procedure described previously. For example, call agent 300 sends a REFER message to communication device A 305 at step 326. At step 328, communication device A 305 sends an INVITE message to the call agent 300 to confirm its availability in the conference bridge in dormant mode. In response to the INVITE message, the call agent 300 sends a 200 OK response at step 332 with an indication that communication device A 305 is part of the conference bridge but inactive or in dormant mode ('a=inactive'). Switching to dormant mode ensures that while communication device A 305 is still a part of the conference bridge and can pick up the call at any time, there is presently no media to and from the call server 315 to communication device A 305. At step 334, communication device A 305 further acknowledges the 200 OK response by sending an ACK message to the call agent 300.

At step 336, the only active communication device in the defined environment, communication device B 310, goes on-hook. Communication device B 310 going on-hook is signaled to the call agent 300 using a NOTIFY message at step 338. The call agent 300 sends a BYE message to communication device B 310 as depicted at step 342 in order to remove communication device B 310 from the in-progress call. After detecting that there are no active participants on the call in the defined environment, the call agent 300 can tear down the call (step 344). The call agent 300 sends a BYE message to all other communication devices in the defined environment that were in the dormant mode, as depicted at step 346. All communication devices are in an idle mode, implying that no call is in progress.

The scenario described above can be applied in the reverse direction when an external user places a call to a communication device in the defined environment. When one of the communication devices in the defined environment goes off hook, all other communication devices are placed in dormant mode. The message exchange after initial call setup is similar to the scenario shown in FIG. 3 and is described in FIG. 4 for ease of understanding.

Figure 4:
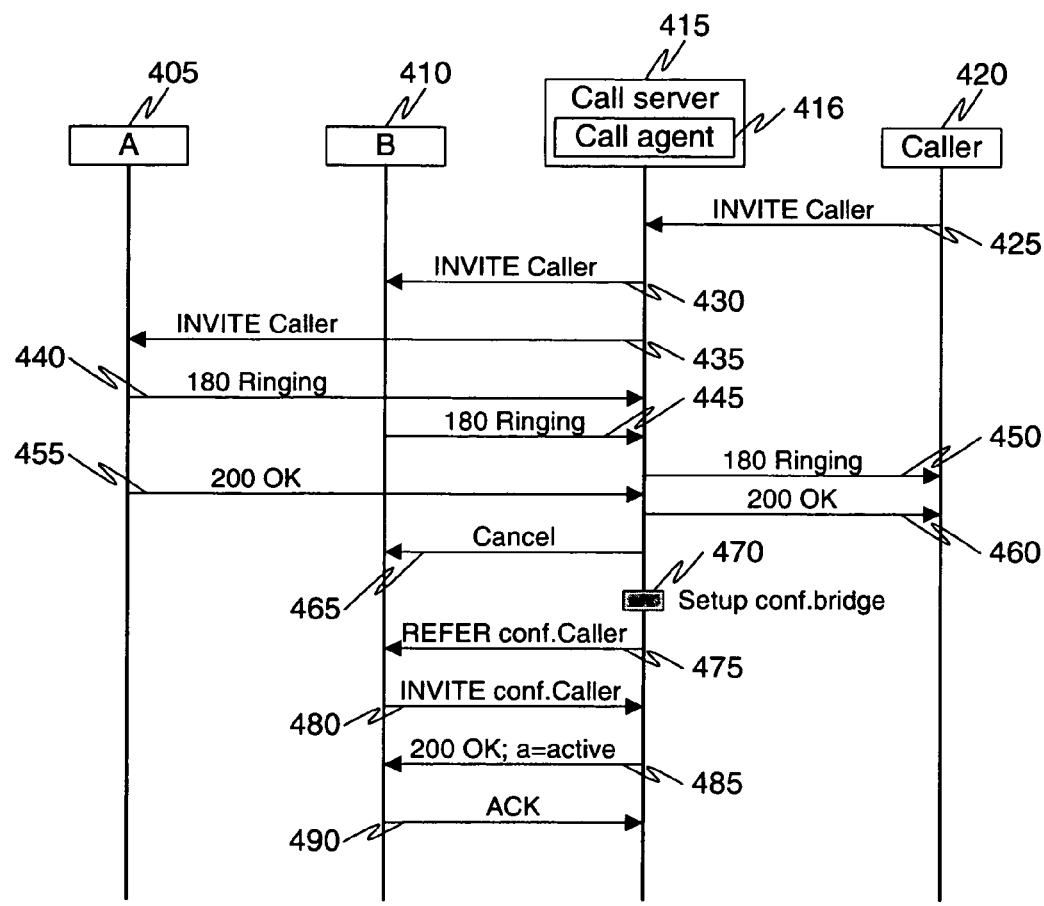
FIG. 4 illustrates a call flow diagram of a scenario where an external communication device calls into a defined environment in accordance with various embodiments of the present invention.

Turning now to FIG. 4, a block diagram illustrating a scenario where an external communication device calls into a defined environment is shown in accordance with the embodiments of the present invention. An external communication device, caller 420, initiates a call to a communication device in the defined environment. The called communication device can be either communication device A 405 or communication device B 410. At step 425, caller 420 sends an INVITE message to a call agent 416. The INVITE message indicates that a call is being placed by the caller 420 to a communication device in the defined environment. In accordance with the embodiment presented in FIG. 4, the call agent 416 resides on a call server 415. The call agent 416 sends the INVITE message to all communication devices in the defined environment. For example, as shown in FIG. 4, the INVITE message is forwarded to communication device B 410 at step 430 and to communication device A 405 at step 435. Upon receiving the INVITE message, the communication devices in the defined environment start ringing. Communication device A 405 and communication device B 410 send a '180 Ringing' notification to the call agent 416 at steps 440 and 445, respectively. At step 450, the call agent 416 forwards the '180 Ringing' message to the caller 420 which indicates that the communication devices in the defined environment are informed about the call. When communication device A 405 accepts the call, it sends a 200 OK to the call agent 416 as depicted at step 455. Those skilled in the art will recognize that any communication device in the defined environment can answer the call. The call agent 416 forwards the 200 OK message to the caller 420 at step 460 in order to setup the call between communication device A 405 and the caller 420. At step 465, the call agent 416 cancels ringing of the communication device B 410 which indicates that the call has been answered by some other communication device in the defined environment. Upon communication device A 405 accepting the call, a conference bridge is setup among the communication devices (step 470).

In the present scenario, communication device B 410 is on-hook. Thus, it is placed in dormant mode. For this purpose, the call agent 416 sends a REFER message to communication device B 410 at step 475. Communication device B 410 sends an INVITE message to the call agent 416 at step 480 to confirm its availability in dormant mode. In response to the INVITE message, the call agent 416 sends a 200 OK response to communication device B 410 at step 485 with an indication that communication device B 410 is part of the conference bridge but inactive or in dormant mode ('a=inactive'). This ensures that while communication device B 410 has joined the conference bridge, no media is sent to and from the call server 415 to communication device B 410. Communication device B further acknowledges the 200 OK response by sending an ACK message to the call agent 416 at step 490.

Those skilled in the art will recognize that once the communication devices within the defined environment have been placed into dormant mode, for example, communication device B 410, the procedure for joining an in-progress call and terminating the call once the last active mode communication device hangs-up, is similar to that disclosed in FIG. 3.

Figure 5:
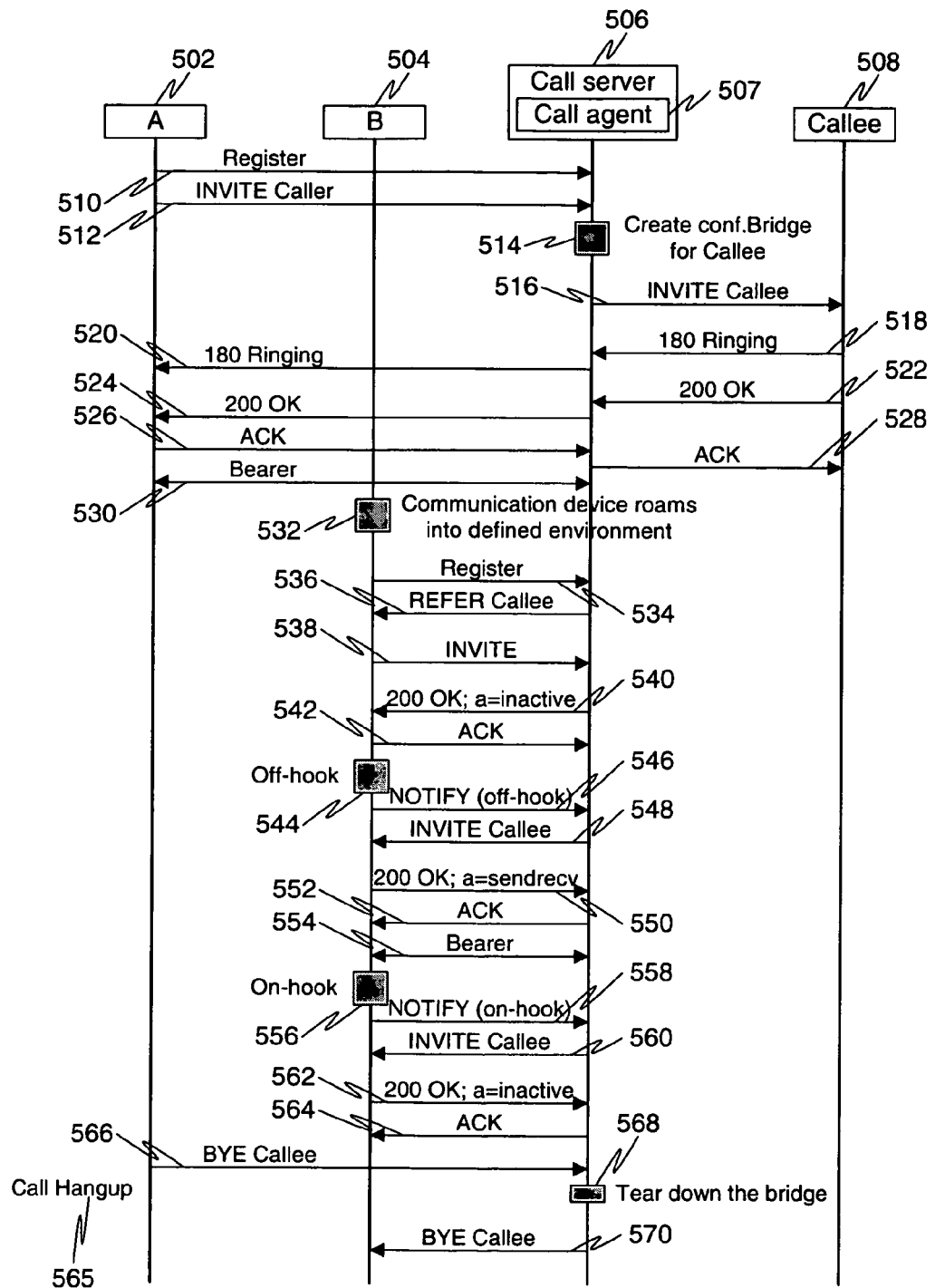
FIG. 5 illustrates a call flow diagram of a scenario where a communication device roams into a defined environment in accordance with various embodiments of the present invention.

Turning now to FIG. 5, a block diagram illustrating a scenario where a communication device roams into a defined environment is shown in accordance with various embodiments of the present invention. Again, a "defined environment" can be a location area serviced by a Voice over Internet Protocol (VoIP) network or a home area comprising a residential gateway connecting either multiple computers in the home to a single Internet connection or all internal home networks (telephone, LAN, cable TV, etc.) to their external counterparts. The communication device roaming in can be a dual-mode communication device that roams into the defined environment from outside the defined environment, for example a cellular network. The communication device roaming into the defined environment is then serviced by a network in the defined environment. Those skilled in the art will appreciate that there may be multiple communication devices registered within the defined environment. For the sake of clarity and ease of presentation only one existing communication device, communication device A 502, is shown initially registered in the defined environment. Communication device B 504 roams into the defined environment and registers with a call agent 507. A call agent 507 services the communication devices in the defined environment to facilitate a cordless extension for the communication devices and the call agent 507 can reside on a call server 506. All communication devices in the defined environment are required to register with the call server 506 such that the call agent 507 can maintain an updated list of all the registered communication devices in the defined environment.

At step 510, communication device A 502 registers with the call agent 507. In accordance with the embodiment of the invention depicted in FIG. 5, communication device A 502 is the only communication device in the defined environment. At step 512, communication device A 502 initiates a call to an external communication device, callee 508, by sending an INVITE to the call agent 507. In response to the INVITE, the call agent 507 creates a conference bridge (step 514). At step 516, the call agent 507 forwards the INVITE message to the callee 508 in order to inform the callee 508 about the call. At step 518, the callee 508 starts ringing and the call agent 507 is notified of the ringing. At step 520, the call agent 507 forwards a message indicating the ringing to communication device A 502. When the callee 508 accepts the call, a 200 OK response is sent to the call agent 507 at step 522. The 200 OK is forwarded to communication device A 502 at step 524. The call is setup when communication device A 502 sends an acknowledgement to the call agent 507 and the call agent 507 forwards the acknowledgement to the callee 508 (steps 526, 528). Communication device A 502 thus becomes a bearer of the call with the callee 508, as shown at 530 and communication device A 502 is placed into active mode.

Continuing with the present scenario, now communication device B 504 roams into the defined environment (step 532) and registers with the call server 506 (step 534). The list of registered communication devices in the defined environment is updated to include communication device B 504. Communication device B 504 can be a dual-mode communication device that roams into the defined environment and becomes an in-home communication device. Alternately, communication device B 504 can be a new communication device that is powered on during the in-progress call. Since there is an active call between communication device A 502 and the callee 508, the call agent 507 places communication device B 504 in dormant mode. For this purpose, the call agent 507 sends a REFER message to communication device B 504 at step 536. Communication device B 504 then sends an INVITE message to the call agent 507 (step 538) to confirm its availability in the dormant mode. In response to the INVITE message, the call agent 507 sends a 'a=inactive' message in a 200 OK response (step 540). The 'a=inactive' indicates that communication device B 504 is a part of the conference bridge but is inactive. This ensures that while communication device B 504 has joined the conference bridge, no media is sent to and from the call server 506 to communication device B 504. Communication device B 504 further acknowledges the 200 OK response by sending an ACK message to the call agent 507 (step 542).

In accordance with the embodiment of the invention depicted in FIG. 5, communication device B 504 decides to join the in-progress call between communication device A 502 and the callee 508. Communication device B 504 is taken off-hook at step 544, for example, by a user picking up the receiver of the communication device B 504. The off-hook information is conveyed to the call agent 507 through a SIP "NOTIFY" message, step 546. The message functions as a stimulus to the call agent 507, which then sends an INVITE to communication device B 504 (step 548) to join the in-progress call. Communication device B 504 accepts the INVITE by sending a response 200 OK to the call agent 507 (step 550). The call agent 507 acknowledges the response 200 OK at step 552. The communication device B 504 changes from dormant to active and the communication device B 504 becomes a bearer of the call, as shown at 554, along with communication device A 502.

In accordance with the embodiment depicted in FIG. 5, communication device B 504 goes on-hook at step 556. Communication device B 504 signals the call agent 507 using a NOTIFY message at step 558. The message functions as a stimulus to the call agent 507 which then sends an INVITE to the communication device B 504 (step 560) along with an "a=inactive" message to indicate that communication device B 504 is now inactive. Communication device B 504 can still join the conference bridge later, provided the call is still active. Communication device B 504 is placed into dormant mode once it goes on-hook since there is an active communication device, communication device A 502, in the defined environment. Communication device B 504 accepts the INVITE by sending a response 200 OK (step 562) to the call agent 507. The call agent 507 acknowledges the response 200 OK at step 564 and communication device B 504 becomes a part of the conference bridge in the dormant mode. Hence, an in-home communication device is not distinguished from communication device B 504 that roamed into the defined environment while communication device B is in the defined environment.

As depicted in FIG. 5, once the only active communication device in the defined environment (communication device A 502) goes on-hook, it sends a BYE message to the call agent 507 (step 566). The call agent 507 tears down the conference bridge at step 568 since there are no active communication devices in the defined environment. The call agent 507 communicates the same to communication device B 504 using a BYE message at step 570. However, if communication device B 504 is still active on the call and communication device A 502 goes on-hook or hangs-up, communication device A 502 will be placed in dormant mode while communication device B 504 is active, which will be appreciated by those skilled in the art.

In FIG. 5 it was assumed that communication device B 504 was not active when it roamed into the defined environment. In one embodiment, if communication device B 504 was already on a call initiated outside the defined environment (for example a cellular network call), communication device B 504 can be placed in dormant mode (using the procedure described in FIG. 5) with respect to the call inside the defined environment and can still remain in active mode with respect to the call outside the defined environment (the cellular network call). In such a scenario, the communication device roaming into the defined environment with an active call, for example communication device B 504, is given an option to join the call in the defined environment, for example by providing a call waiting or a call switching facility. The option allows communication device B 504 to switch between the cellular call and the call in the defined environment or join the call in the defined environment after terminating the cellular call.

Figure 6:
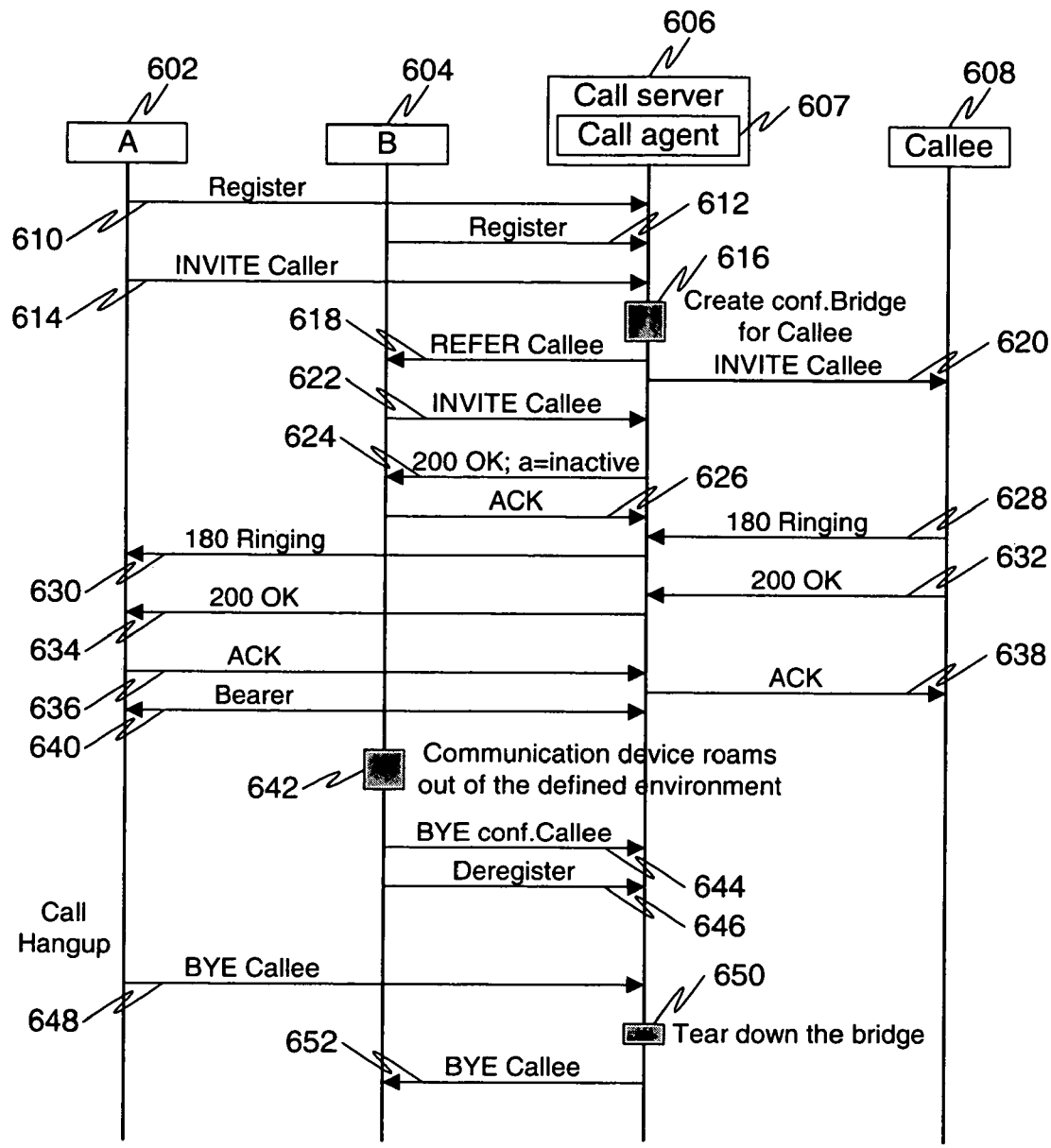
FIG. 6 illustrates a call flow diagram of a scenario where a communication device roams outside a defined environment in accordance with various embodiments of the present invention

Turning now to FIG. 6, a block diagram illustrating a scenario where a communication device roams outside the defined environment is shown in accordance with embodiments of the present invention. As illustrated in FIG. 6, there are two communication devices within the defined environment, communication device A 602 and communication device B 604. However, those skilled in the art will recognize that the number of communication devices in the defined environment is not restricted to two, and the method applies to arbitrary number of communication devices in the defined environment. In one embodiment, an external communication device, callee 608, resides outside the defined environment. Communication device A 602 and communication device B 604 that are residing in the defined environment are required to register with a call server 606 as shown at steps 610 and 612. A call agent 607 services the communication devices in the defined environment to facilitate a cordless extension for the communication devices. The call agent 607 can reside on a call server 606. The call agent 607 maintains an updated list of all registered communication devices in the defined environment.

In accordance with the embodiment of the invention depicted in FIG. 6, when a user places a call using communication device A 602 to the external communication device, callee 608 communication device A 602 sends an INVITE message to the call agent 607 (step 614). The INVITE message triggers the call agent 607 to automatically create a conference bridge (step 616) since there can be multiple communication devices registered in the defined environment, any of which may join the call at any point in time.

As stated previously, since communication device B 604 is not participating in the call, for example is on-hook, the call agent 607 places the communication device B 604 in dormant mode. Placing the communication device B 604 in dormant mode comprises the call agent 607 sending out a REFER message (step 618) to communication device B 604 since it may potentially join the conversation with communication device A 602. At step 620, the call agent 607 notifies the callee 608 of the call by sending an INVITE including a conf-id. Communication device B 604 sends an INVITE message to the call agent 607 at step 622 to confirm its availability in dormant mode. In response to the INVITE message, the call agent 607 sends an 'a=inactive' message in a 200 OK response (step 624) indicating that communication device B 604 is a part of the conference bridge but is inactive. This ensures that while communication device B 604 has joined the conference bridge, no media is sent to and from the call server 606 to communication device B 604. Communication device B further acknowledges the 200 OK response by sending an ACK message to the call agent 607 (step 626).

At step 628, the callee 608 starts ringing and notifies the call agent 607 of the ringing (step 628). At step 630, the call agent 607 forwards a message indicating the ringing to communication device A 602. When the callee 608 accepts the call, it sends a 200 OK response to the call agent 607 (step 632 The response is forwarded to communication device A 602 at step 634. The call is setup when communication device A 602 sends an acknowledgement to the call agent 607 (step 636) and the call agent 607 forwards the acknowledgement to the callee 608 at step 638. Communication device A 602 becomes a bearer of the call with the callee 608, as shown at 640, and communication device A 602 is, consequently, put in the active mode.

In accordance with the embodiment depicted in FIG. 6, at step 642, communication device B 604 roams out of the defined environment. Communication device B 604 can be a dual-mode communication device that roams out of the defined environment and becomes an external communication device. A dual-mode communication device is a communication device that can be serviced by a network in the defined environment and by a network outside the defined environment such as a cellular environment. Alternately, the communication device B 604 can be powered off during the in-progress call between communication device A 602 and the callee 608. Two situations are dealt with in this scenario. For example, when the communication device roaming out of the defined environment is in dormant mode in the defined environment and when the communication device roaming out of the defined environment is in active mode in the defined environment. Communication device B 604 recognizes that it is about to roam outside the defined environment (or power off) while in dormant mode with respect to the call in the defined environment, for instance communication device B 604 is on-hold. Communication device B 604 sends a BYE message to the call agent 607 at step 644 and deregisters from the defined environment at step 646. The list of registered communication devices in the defined environment is updated to delete an entry corresponding to communication device B 504. In case the transition from the defined environment to a network outside the defined environment occurs before the deregistration is complete, the deregistration can occur due to a timeout or due to the call server 606 recognizing that the communication device B 604 has registered with a network outside the defined environment. This would cause the call agent 607 to terminate the SIP session to communication device B 604. Communication device B 604 roaming out of the defined environment during an in-progress call within the defined environment, does not affect the in-progress call within the defined environment, for example the in-progress call of communication device A 602. The call appearance drops from the communication device B 604 on roaming out.

In another embodiment of the present invention, communication device B 604 roams out of the defined environment while in active mode (call in-progress) while communication device A 602 within the defined environment is in dormant mode. In accordance with the present embodiment, those skilled in the art will appreciate that there can be more than one communication device within the defined environment and all of them can be in dormant mode while communication device B 604 roams out of the defined environment in active mode. Communication device B 604 transfers the active call from the network in the defined environment to a network outside the defined environment, for example to a cellular network. Communication device B 604 de-registers from the network in the defined environment. Upon receiving the deregistration message from communication device B 604, the call agent 607 determines that there are no active communication devices in the defined environment. The call agent 607 then sends a BYE message to all dormant communication devices in the defined environment and the bridge is torn down.

In yet another embodiment of the invention, communication device B 604 roams out of the defined environment in active mode (call in-progress) and at least one communication device in the defined environment, for example communication device A 602, is also in active mode (call in-progress). In such a case, the call continues on communication device B 604 and communication device A 602. The call appearance exists on all dormant phones in the defined environment. When communication device B 604 goes on-hook outside the defined environment, the state of communication device B 604 becomes idle (more specifically it is not dormant). Analogously, when the last active communication device in the defined environment, for instance communication device A 602, goes on-hook, the communication devices within the defined environment are all made idle (more specifically, they are not put in dormant state). Those skilled in the art will appreciate that there can be more than one communication device within the defined environment at any given time. Communication device B 604 transfers the active call from the network in the defined environment to a network outside the defined environment, for example to a cellular network. Communication device B 604 de-registers from the network in the defined environment. On receiving the deregistration message from communication device B 604, the call agent 607 determines that there are active communication devices, for example communication device A 602, in the defined environment and the call continues within the defined environment.

Referring back to FIG. 1, a block diagram of a Call Agent (CA) is illustrated in accordance with embodiments of the present invention and is indicated generally at 115. The CA 115 is configured to detect that a communication device of the plurality of communication devices is in a call in a defined environment, and automatically creates a conference bridge involving all of the plurality of communication devices. As per one embodiment, the CA 115 includes a processor 116 responsible for placing a communication device in one of an active mode, a dormant mode and an idle mode. The processor 116 places a communication device, which is registered with a call server servicing communication devices in the defined environment, in the active mode if there is an in-progress call in the defined environment and the communication device is off-hook. The processor 116 places a communication device in the dormant mode if there is an in-progress call in the defined environment and the communication device is on-hook. The processor 116 places a communication device in an idle mode if there is no call in progress in the defined environment. The processor 116 is further configured to tear down an in-progress call when none of the plurality of communication devices is in the active mode.

A plurality of communication devices in the defined environment are registered with the call server servicing communication devices in the defined environment and the CA 115 maintains an updated list of all registered communication devices in the defined environment, including the dual-mode communication devices that roam into or out of the defined environment. Moreover, when a call is setup (call initiated or received by a communication device in the defined environment), the CA 115 can be responsible for setting up a conference bridge for that call. Subsequently, the CA 115 invites all the other communication devices to join the conference bridge. The communication device can show a call in-progress and can allow a user to pick up the call. Picking up entails ongoing calls. An algorithm for facilitating the cordless extension for the plurality of communication devices in the defined environment could reside on the CA 115. The CA 115 can be located in a Voice over Internet Protocol (VoIP) operator's network or inside a home (located in a residential gateway known in the art). The defined environment associated with the CA 115 changes according to the location of the CA 115. The choice of the CA location can be influenced by business considerations. For example, some business considerations may dictate that the CA 115 be implemented in the "core network" (for example, as a feature in the IP Multimedia Subsystem (IMS) core) while other considerations may dictate that the CA 115 be implemented inside a residential gateway offering. Those skilled in the art will recognize that the working details of the CA 115 would differ slightly based on the implementation and the associated business model and all such implementations are within the scope of the present invention.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method for providing a cordless extension system for a plurality of communication devices in a defined environment, the method comprising:
   detecting, by a call agent, that a first communication device of the plurality of communication devices is placing a call in the defined environment;
   in response to detecting, automatically creating a conference bridge involving all of the plurality of communication devices in the defined environment, wherein the first communication device is placed in an active mode, and wherein a second communication device of the plurality of communication devices that is on-hook is placed in a dormant mode.

2. The method of claim 1 further comprising:
   detecting that the second communication device of the plurality of communication devices is off-hook; and
   placing the second communication device in the active mode.

3. The method of claim 2 further comprising:
   detecting that one of the first and second communication devices has gone on-hook; and
   placing the one of the first and second communication devices on hold as long as any of the plurality of communications devices is in the active mode.

4. The method of claim 3 further comprising tearing down the call when none of the plurality of communication devices is in the active mode.

5. The method of claim 2 further comprising:
   detecting that the second communication device has roamed out of the defined environment;
   when the second communication device goes on-hook, placing the second communication device in an idle state; and
   when all communication devices in the defined environment are on-hook, placing all communication devices in the defined environment in the idle state.

6. The method of claim 1 further comprising:
   detecting that a third communication device has roamed into the defined environment; and
   adding the third communication device to the conference bridge in the dormant mode when the third communication device is not in a call initiated outside of the defined environment.

7. The method of claim 6 further comprising when the third communication device is in a call initiated outside of the defined environment, adding the third communication device to the conference bridge in the dormant mode with respect to the call in the defined environment and in the active mode with respect to the call initiated outside of the defined environment.

8. The method of claim 7 wherein when the third communication device is in a call initiated outside of the defined environment, the method further comprises providing the third communication device with an option to join the call in the defined environment.

9. The method of claim 1 further comprising:
   detecting that the first communication device is no longer active and has roamed out of the defined environment; and
   terminating the call when all other phones in the defined environment are in dormant mode.

10. A call agent that provides a cordless extension system for a plurality of communication devices in a defined environment, the call agent configured to detect that a first communication device of the plurality of communication devices is in a call in the defined environment; and automatically create a conference bridge involving all of the plurality of communication devices in the defined environment, wherein the first communication device is placed in an active mode, and wherein a second communication device of the plurality of communication devices that is on-hook is placed in a dormant mode.

11. The call agent of claim 10 further configured to detect that the second communication device of the plurality of communication devices is off-hook and place the second communication device in the active mode.

12. The call agent of claim 11 further configured to detect that one of the first and second communication devices has gone on-hook and place the one of the first and second communication devices on hold as long as any of the plurality of communication devices is in the active mode.

13. The call agent of claim 12 further configured to tear down the call when none of the plurality of communication devices are in the active mode.

14. The call agent of claim 10 further configured to detect that a second communication device has roamed into the defined environment and add the second communication device to the conference bridge in the dormant mode when the second communication device is not in a call initiated outside of the defined environment.

15. The call agent of claim 14 further configured to add the second communication device to the conference bridge in the dormant mode with respect to the call in the defined environment and in the active mode with respect to the call initiated outside of the defined environment when the second communication device is in a call initiated outside of the defined environment.

16. The call agent of claim 15 further configured to provide the second communication device with an option to join the call in the defined environment when the second communication device is in a call initiated outside of the defined environment.

\* \* \* \* \*